Feb. 25, 1969
R. AKASHI
3,429,352
LOCK COLLAR NUT
Filed Nov. 29, 1966
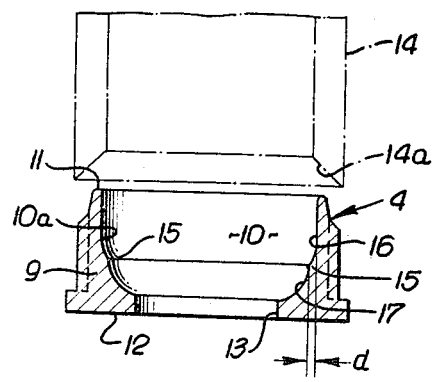
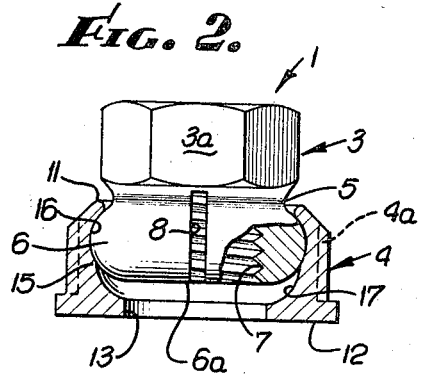
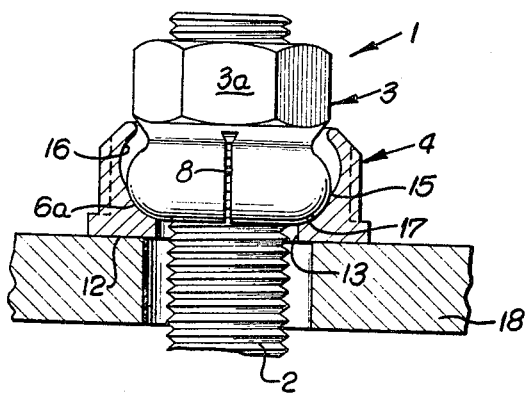
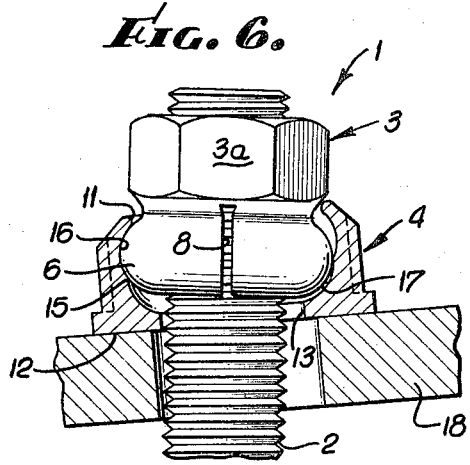
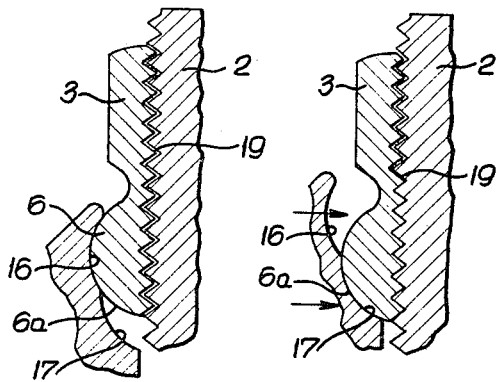
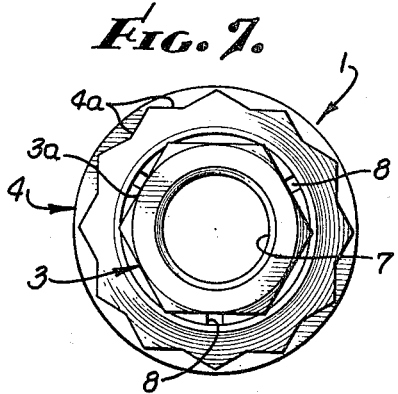
INVENTOR.
ROBERT AKASHI
By White & Haefliger
ATTORNEYS.

3,429,352
LOCK COLLAR NUT
Robert Akashi, 2059 W. 161st St.,
Gardena, Calif. 90247
Filed Nov. 29, 1966, Ser. No. 597,710
U.S. Cl. 151—19                    5 Claims
Int. Cl. F16b 39/36

ABSTRACT OF THE DISCLOSURE

A locknut assembly for a threaded stem is provided comprising a threaded tubular fastener having an inwardly deflectable skirt and a retaining collar for the fastener which coact in one relation to retain the fastener at the work without locking and in a second relation to lock the fastener in engagement with a threaded stem. The retaining collar varies in radius along its axis to provide two chambers separated by an interference shoulder into the first of which the fastener skirt is receivable in an undeflected condition for retention and in the second of which the fastener skirt is receivable in an inwardly deflected condition for locking against the stem.

---

This invention is concerned with fasteners of the generally tubular type having an internally threaded bore and adapted to be secured to a threaded stem; and has particular reference to a lock nut fastener which in the normal course of tightening on a stem changes in bore diameter to lock onto the stem against spontaneous rotation induced by vibration on other causes and which is, in addition, retainable at the work surface prior to tightening on the stem.

A particular aspect of the present invention has reference to the provision of an inwardly deflectable skirt formed on a tubular fastener and defining therewith a threaded bore sized to engage a stem and the provision of a coacting retaining collar to receive and retain the skirt with interference engagement sufficient to inwardly deflect the skirt into locking engagement with the stem extending therethrough in response to force transmission by the stem acting to urge the skirt in a direction tending to overcome said interference engagement.

In various embodiments of the invention, the lock nut assembly has features to facilitate transition of the fastener skirt into locking engagement including outwardly convexly curving the skirt in axial radial planes to taper the skirt at the locus of interference engagement, and additionally, to impart radial compressibility to the skirt by provision of slotted apertures extending in the skirt wall parallel to the skirt axis and at circumferentially spaced locations. The retaining collar may be internally recessed to afford a cup-shaped configuration having a lip and, spaced from the lip, an inwardly projecting annular shoulder defining the locus of interference engagement. On both sides of the shoulder there may be formed chambers, suitably including a first chamber extending between the collar lip, which may be inwardly deformed over the skirt, and the shoulder and having a radius to retainably accommodate the skirt in undeflected condition, and a second chamber extending from the other side of the shoulder to the base of the collar and of a smaller radius to accommodate the skirt only in inwardly deflected condition and in locking relation with the stem.

The invention will be more fully described and details and advantages thereof made apparent in the following description taken in conjunction with the attached drawings in which:

FIG. 1 is a view in vertical section of the retaining collar with the staking tool for inwardly deforming the collar lip shown in phantom outline;

FIG. 2 is a view in elevation of a lock nut assembly according to the invention with the retaining collar shown in section; the assembly is in the retaining relation;

FIG. 3 is a view similar to FIG. 2 showing the lock nut assembly in locking relation in association with a workpiece;

FIG. 4 is a view in section of showing the threaded engagement pattern in the retaining relation;

FIG. 5 is a view like FIG. 4 showing the threaded engagement pattern in the locking relation;

FIG. 6 is a view like FIG. 3 illustrating the seating of the fastener skirt in the retaining collar when stem and workpiece are misalined; and FIG. 7 is a plan view of the lock nut assembly.

Turning now to the drawings in detail, with reference to FIGS. 1-3 there is shown a lock nut assembly generally indicated at 1 secured to a stem in the form of a threaded shaft 2. As depicted, the lock nut assembly includes, in combination, a tubular fastener illustrated as nut 3 and a retaining collar 4 therefor.

The nut 3 forming the tubular fastener portion of the combination is seen to be shaped in a particular way having reference to the purposes and principles of the invention. Specifically, the nut is provided with the conventional polygonal, tool engaging portion 3a, but in addition there is formed on the nut, as an extension across an intervening necked-in portion, waist 5, a skirt 6 of generally bulbous configuration which together with the conventional nut portion defines a threaded bore 7 (FIG. 2). The skirt is outwardly convexly curved in axial radial planes and is provided with a vertically extending aperture such as split 8 leading inwardly from the leading edge 6a of the skirt. The purpose of the vertically extending aperture is to facilitate inward deflection of the skirt and accordingly the length and width of the split 8 is chosen to permit the required degree of deflection and for a distance determined by the interior configuration of the retaining collar. One or more apertures may be provided in the skirt and typically a plurality at circumferentially spaced locations will be employed, e.g. two at 180°, three at 120° or four at 90° spacing around the perimeter of the skirt 6.

The fastener nut is received and retained in the retaining collar which is seen to include a generally cup-shaped body 9 having a central recess 10 extending from lip 11 to base 12. An aperture 13 is provided centrally of the base to receive the shaft 2. The lip 11 is inwardly conformable to be staked over the within received skirt portion of the nut 3 by downward force of staking tool 14 engaging the lip 11 with forming surface 14a. When thus conformed, the lip 11 enters into the cylindrical plane of the nut 3 at waist 5 thereby to enclose the within portion of the nut and retain the nut against lateral or vertical movement while permitting rotative motion, as seen in FIG. 2.

The interior wall 10a forming the central recess 10 is specifically formed to carry out the purposes of the invention. In general, it is required to provide an interference engagement along this wall, 10a, which will inwardly radially deflect the skirt 6 of the nut. This is accomplished by shaping the retaining collar interiorly to form a downwardly tapering annular shoulder 15 and on the upper side thereof a first spherically segmented chamber 16 of relatively larger radius to accommodate the skirt 6 in an undeflected condition and in retaining relation in conjunction with the staked over lip 11; and at the lower side of the shoulder a second spherically segmented chamber 17 of relatively smaller radius to accommodate the skirt 6 only in an inwardly radially deflected condition and in locking relation against the shaft 2.

The transition from the retained to the locked relation is effected by force transmission by the shaft 2 acting to urge the skirt 6 in a direction tending to overcome the interference afforded by the annular shoulder 15. In response to this force, the skirt moves downwardly from larger chamber 16 to smaller chamber 17 with the tapered surface 6a of the skirt sliding past the edge 15a (FIG. 1) of the shoulder. Because the inside diameter of the shoulder is less than the outside diameter of the skirt at its greatest girth there occurs on relative movement of the skirt and shoulder an inward radial compression of the skirt reflected in a narrowing of the split 8 from the width shown in FIG. 2 to that shown in FIG. 3. This narrowing is, of course, proportional to the interference provided by the shoulder 15. The interference is determined by the inward projection distance $d$ (FIG. 1) of the shoulder and is selected to provide a seat for the skirt in the retained relation and to provide inward deflection of the skirt by interference engagement on skirt movement from chamber 16 to chamber 17.

The lock nut assembly is designed to afford quick positive engagement of the combination with the shaft. In practice, the retaining collar 4 is fitted over the shaft 2 extending through workpiece 18 and fastener nut 3 is threaded on. Threading is continued until waist 5 is below the lip 11. Staking tool 14 is then brought to bear against the lip 11 and the upper chamber 16 is thus formed between the lip and shoulder to retain the skirt 6 of the fastener nut. At this time the skirt is firmly seated on the shoulder 15. The assembly is placed in the locked relation by continuing relative rotation of shaft 2 and nut 3. The shoulder typically provides an interference of 0.003 to 0.005 inch for a 4 to 5 thread tightening advance of the nut. There is therefore a 0.006 to 0.010 diametrical constriction of the skirt in passing the shoulder. The effect of this constriction, which is maintained in the lower, locking chamber 17 is illustrated in FIGS. 4 and 5. In FIG. 4, the thread relation between shaft 2 and nut 3 prior to any inward deflection of the skirt 6 is shown. In FIG. 5 the skirt 6 has been inwardly deflected (FIG. 3) and the clearance 19 between opposing thread faces is reduced, even eliminated. The relation of the threads of the undeflected portion of the nut to the shaft remains unchanged above the shoulder (interference) level. Tightening of the nut is continued until the skirt is seated in the chamber 17 which is conveniently congruent as shown.

It is a particular advantage of the present lock nut assembly that misalinement of the shaft and workpiece does not prevent a satisfactory tightening and the achievement of the locked relation. With reference to FIG. 6 it can be seen that the skirt 6 will seat in the chamber despite the angularity of the workpiece-shaft relation. The shoulder 15 even in this event acts to inwardly deflect the skirt into locking engagement with the shaft.

Final tightening is effected by relative turning of the shaft and nut. Loosening of the assembly is readily accomplished by relatively turning the shaft and nut and holding the retaining collar by tool engaging faces 4a (FIG. 7).

Once secured to the workpiece on the shaft 2 the lock nut assembly will not loosen by vibration as the disturbances are absorbed and dissipated by the slotted skirt so that relief by turning is not required.

Having thus described my invention it will be understood that the foregoing is illustrative of an embodiment thereof and the invention is not limited except as set forth in the following claims.

Typically, in moving from FIG. 4 to FIG. 5 condition the nut and shaft undergo a minimum relative rotation of four turns to draw the nut into such tight frictional interference gripping relation with the collar as to retain the nut and collar against separation due to vibration, even though the collar disengages the base 18. Thus, the function of tightened double nuts on a shaft is realized by means of a single nut, since the latter remains locked to the shaft.

I claim:
1. Lock nut assembly adapted to be secured to a forwardly extending threaded stem including in combination a tubular fastener and a retaining collar therefor, said fastener including a radially inwardly deflectable skirt and defining a threaded bore sized to engage the stem; said retaining collar receiving and retaining said skirt and being apertured to receive the stem and characterized in that
 (a) the collar has an internal and forward seat ultimately engageable by the skirt,
 (b) the fastener is subject to forward advancement progressively toward the seat in response to relative rotation of the fastener and stem,
 (c) the collar has an internal interference shoulder spaced rearwardly of the forward seat and having such interference engagement with the outer side of the skirt when the skirt is out of advancement stopping engagement with the seat that the skirt is deflected inwardly toward the stem in response to skirt advancement past the interference shoulder and toward the seat,
 (d) said spacing being sufficient and the forward portion of the skirt being sufficiently free of connection to the collar that said forward portion is free for rotary advancement beyond the interference shoulder and relative to the collar while remaining in stem gripping inwardly deflected condition prior to ultimate engagement with the seat, the seat being angled to effect increased gripping of the stem by the fastener as the fastener engages the seat,
 (e) said retaining collar being generally cup-shaped and having a lip projecting rearwardly of the interference shoulder, the collar defining a first chamber extending between said lip and shoulder and a second chamber extending from the other side of said shoulder and having a reduced cross section to accommodate said skirt only in inwardly deflected condition and in locking relation with the stem as the fastener engages the seat,
 (f) said skirt being outwardly convexly curved in axial radial planes and having at circumferentially spaced locations forwardly extending splits terminating at the forward terminal of the skirt, whereby the narrowing of said splits by inwardly deflecting said skirt enables overcoming of said interference and passage of the skirt from said first to said second chamber, and
 (g) the second chamber being inwardly concavely curved in axial radial planes in such general conformity with said skirt curvature as to seat said skirt in locking relation at varying angles of fastener alignment.

2. Lock nut assembly according to claim 1 in which said skirt and retaining collar shoulder are forwardly tapered at the locus of said interference engagement.

3. Lock nut assembly according to claim 1 in which the skirt is outwardly convexly curved in axial radial planes, and has stem engaging threads with pitch distance less than the distance of travel of the skirt in advancing from initial engagement with said interference shoulder to tight engagement with said seat, the fastener having wrench grip flats projecting rearwardly of the collar.

4. Lock nut assembly according to claim 1 in which said retaining collar lip is controllably deformable to overlie said skirt when such is seated on said annular shoulder, thereby to retain said fastener skirt within said first chamber.

5. Lock nut assembly according to claim 1 in which the fastener bore threading has pitch characterized in that the fastener moves at least four pitch intervals from undeflected condition in said first chamber to fully deflected condition in said second chamber.

References Cited

UNITED STATES PATENTS

| 1,384,019 | 7/1921 | Johnston et al. | 151—19 |
| 2,882,948 | 4/1959 | Wallace | 151—19 |
| 3,087,371 | 4/1963 | Orner | 151—19 |

FOREIGN PATENTS

| 698,369 | 11/1930 | France. |
| 804,872 | 5/1951 | Germany. |
| 305,278 | 2/1929 | Great Britain. |

EDWARD C. ALLEN, *Primary Examiner.*